(12) United States Patent
Hofer

(10) Patent No.: US 7,096,822 B2
(45) Date of Patent: Aug. 29, 2006

(54) ANIMAL FEEDING APPARATUS

(76) Inventor: Gilbert Hofer, Box 117, Treherne, Manitoba (CA), R0G 2V0

( * ) Notice: Subject to any disclaimer, the term of this patent is extended or adjusted under 35 U.S.C. 154(b) by 0 days.

(21) Appl. No.: 10/338,052

(22) Filed: Jan. 8, 2003

(65) Prior Publication Data

US 2004/0129228 A1 Jul. 8, 2004

(51) Int. Cl.
*A01K 39/00* (2006.01)
*A01K 5/01* (2006.01)

(52) U.S. Cl. .......................... 119/53.5; 119/53; 119/54
(58) Field of Classification Search ................ 119/53.5, 119/53, 54, 55, 515, 521
See application file for complete search history.

(56) References Cited

U.S. PATENT DOCUMENTS 3,099,980 A * 8/1963 Merkle ........................ 119/57
4,729,344 A * 3/1988 Winkel ...................... 119/53.5
5,245,949 A * 9/1993 Hively ......................... 119/53
5,642,688 A * 7/1997 Bannier et al. ............... 119/53
5,829,383 A * 11/1998 Blanding .................... 119/52.3
5,839,389 A * 11/1998 Fujii ............................ 119/53
6,199,511 B1 * 3/2001 Thibault ...................... 119/53

* cited by examiner

*Primary Examiner*—Charles T. Jordan
*Assistant Examiner*—John W. Zerr
(74) *Attorney, Agent, or Firm*—Adrian D. Battison; Michael R. Williams; Ryan W. Dupuis

(57) ABSTRACT

A feeding apparatus comprises a frame being arranged to be supported to a suitable support structure, a stationary bowl member having an open bottom end being arranged to hold feed and a rotatable plate at the open bottom end of the bowl member. An adjustment mechanism being arranged for spacing the plate from the bottom end of the bowl member such that rotation of the plate releases the feed onto the plate for feeding.

10 Claims, 3 Drawing Sheets

ANIMAL FEEDING APPARATUS

FIELD OF THE INVENTION

The present invention relates to a feeding apparatus for swine.

BACKGROUND

Feeding of piglets in the farrowing crates is normally done in either round bowls or flat rectangular pans that are totally open on top and sit on the floor of the farrowing crate, unfastened or fastened in some way to the floor of the farrowing crate. This feeder usually is either full of urine/manure or spoiled feed that was urinated/dunged upon. With the feeder being on the floor some piglets like to sleep in the feeder and thereby also increase the feed wastage and problems associated with this type of creep feeder.

SUMMARY

The present invention allows for the feeder to be elevated off the floor of the farrowing crate (prevents pigs from urinating/dunging in which it contributes to wasted feed) and also brings the feed to "eye level" of the piglets, improving consumption of feed in the farrowing crates.

The present invention also provides a small hopper which holds the feed and with the rotating of the plate dispenses fresh feed onto the plate.

The present Invention provides a cone shape of the hopper along with the cross members offer support but also prevent bridging of the feed placed in the feeder.

The design also allows for the feeder to be placed inside the penning between two farrowing crates allowing two pens to eat from each feeder, thereby reducing the number of feeders required per farrowing room.

According to the present invention there is provided a feeding apparatus comprises:

- a frame being arranged to be supported to a suitable support structure;
- a stationary bowl member having an open bottom end being arranged to hold feed;
- a rotatable plate at the open bottom end of the bowl member;
- an adjustment mechanism being arranged for spacing the plate from the bottom end of the bowl member;
- wherein rotation of the plate releases the feed onto the plate for feeding.

Preferably the plate has a flat surface.

Conveniently the plate has an upwardly extending outer peripheral lip to avoid spillage and waste.

Conveniently brace arms extend horizontally through the bowl connected to the frame on respective sides of the bowl.

Conveniently a shaft extends through the brace arms vertically through a centre of the bowl and is connected to the plate.

Conveniently the bowl is arranged to be connected at a top end to a feed container.

Preferably the circumference of the plate is larger than the circumference of the open bottom end of the bowl.

BRIEF DESCRIPTION OF THE DRAWINGS

In the accompanying drawings, which illustrate an exemplary embodiment of the present invention.

DETAILED DESCRIPTION

Figure 1:
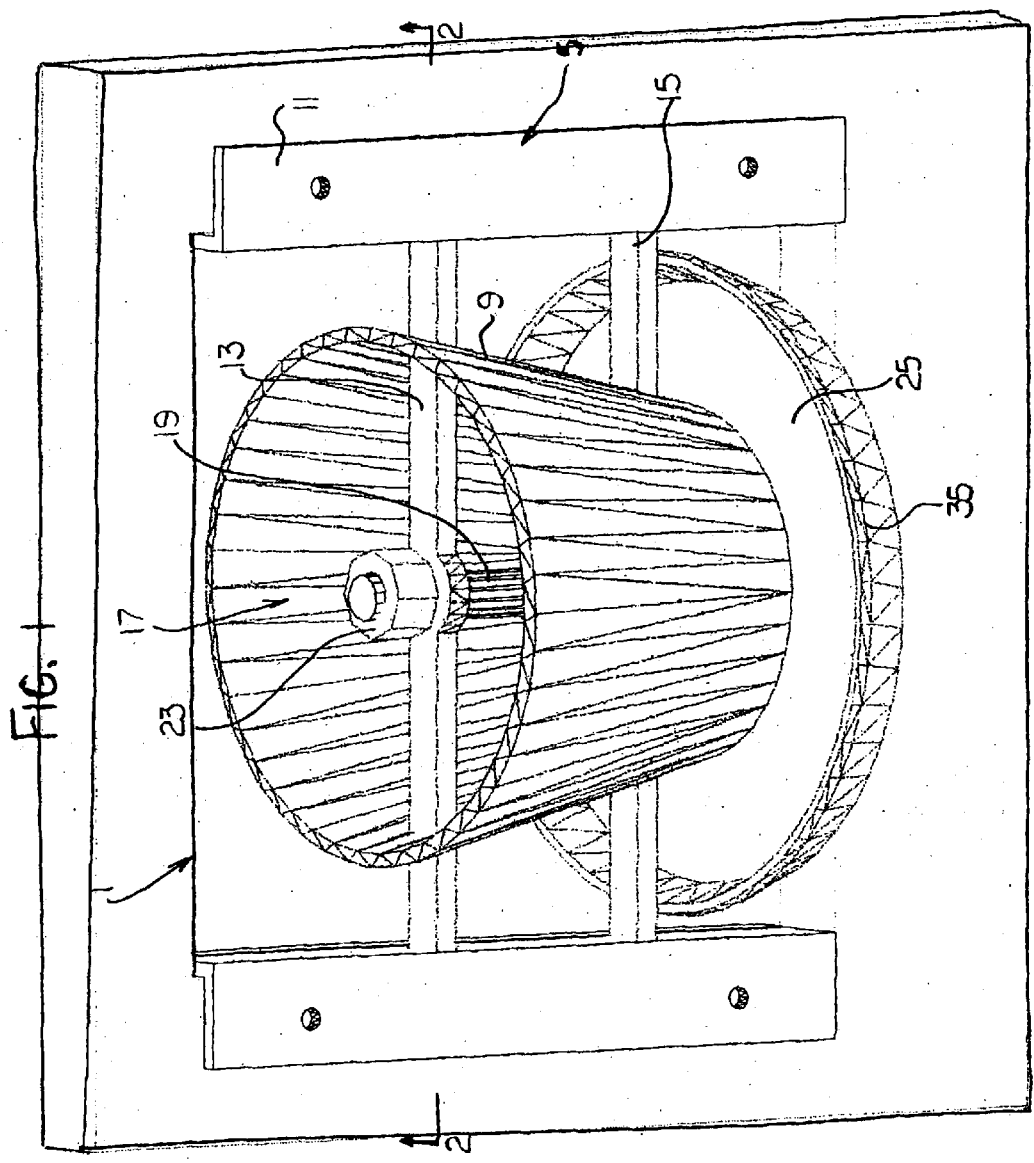
FIG. 1 is an isometric view of the present invention.
Figure 2:
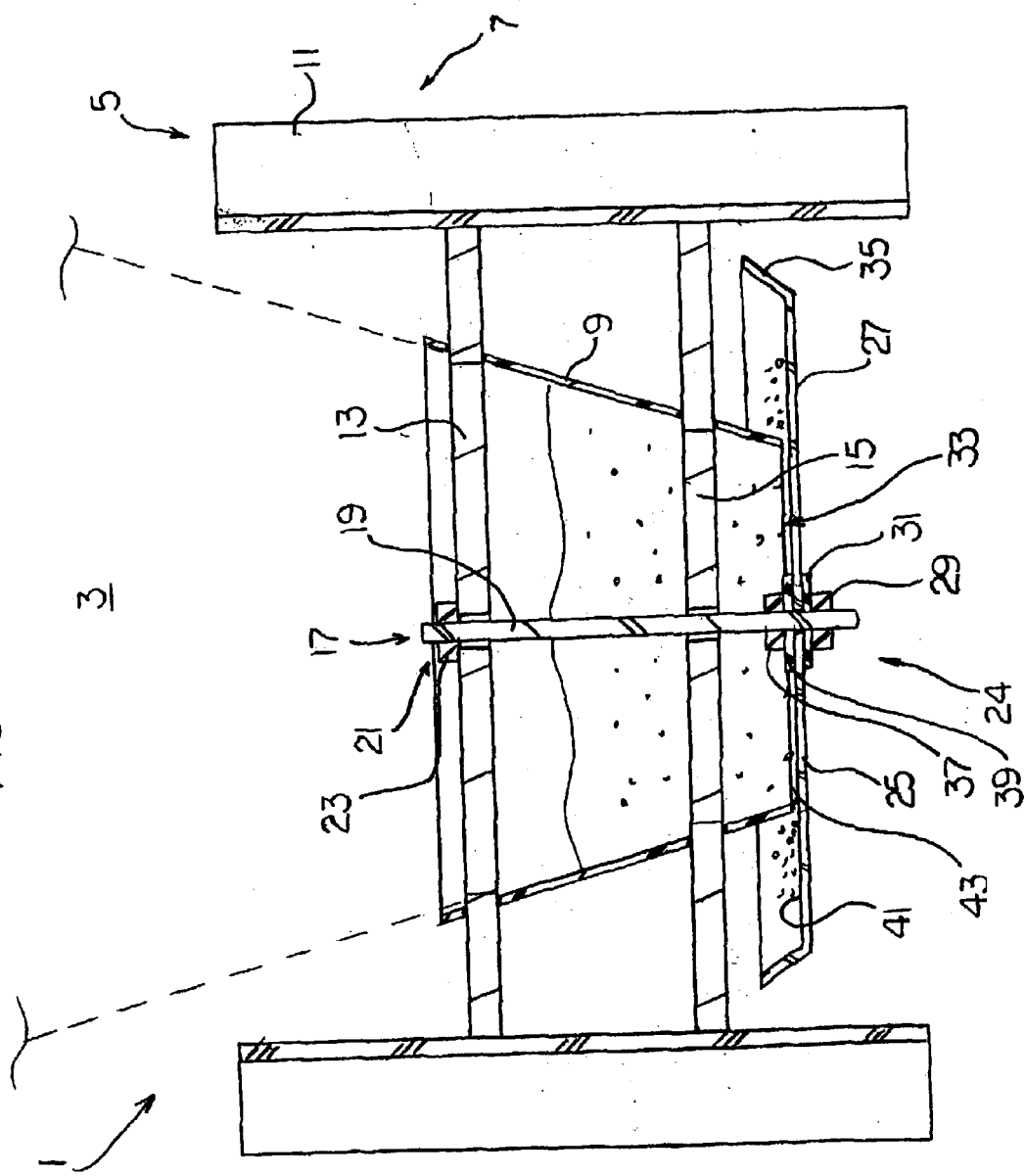
FIG. 2 is a vertical cross section along the lines 2—2 of FIG. 1.
Figure 3:
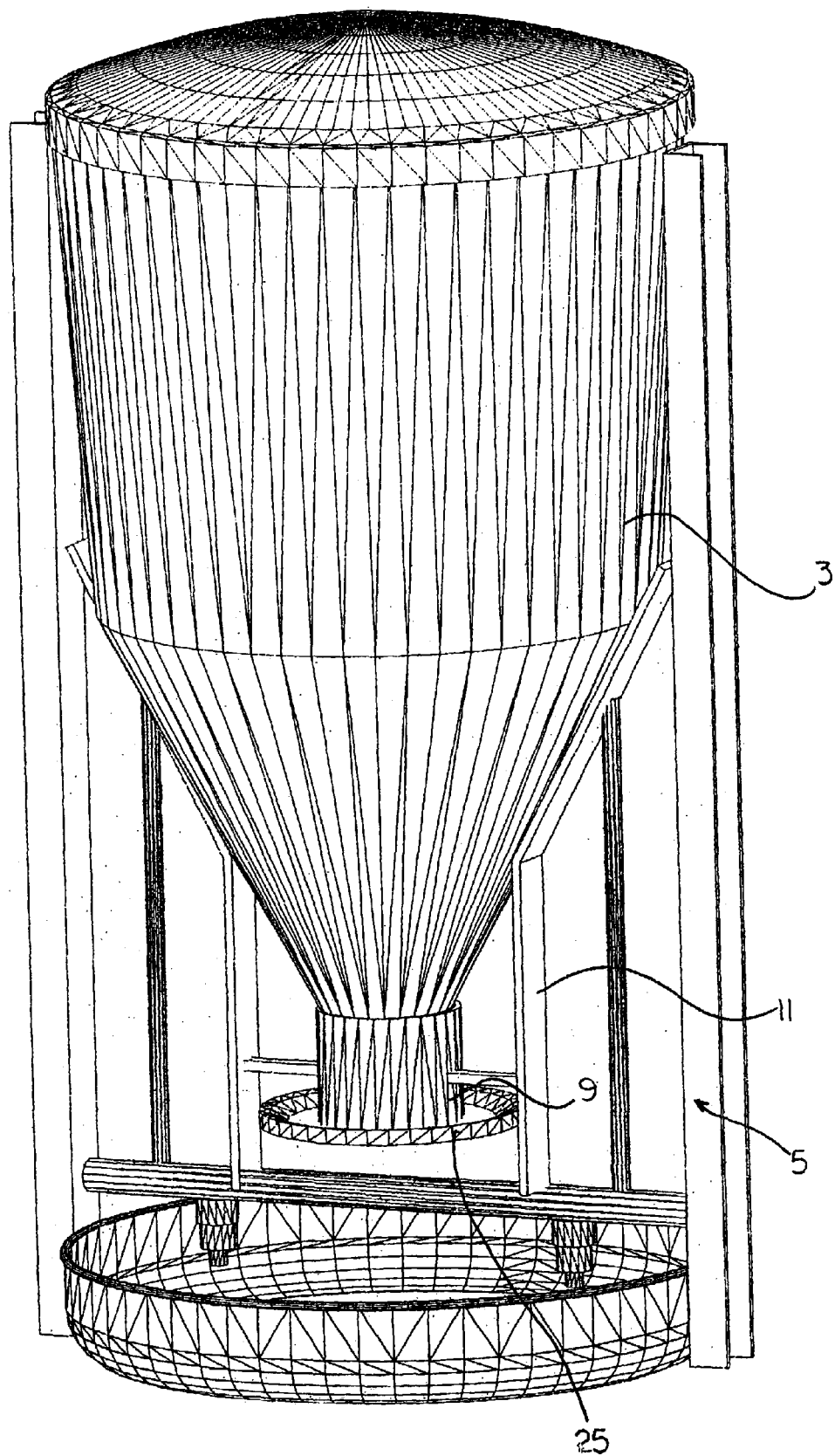
FIG. 3 is an isometric view of a larger version of the present invention

A feeding apparatus 1 provides a user with a suitable source for providing feed to animals such as hogs/pigs. The feeder illustrated in FIG. 1 is to be used In the first stage after weaning. The apparatus has a frame 5 which is arranged to be attached between the walls of the farrowing crate penning. A bowl 9 is mounted to the frame coupled to the bottom end of the feed container such that the feed is released from the container into the bowl. The frame has a pair of side brackets 11 which are coupled to the feed container housing. An upper brace arm 13 and a lower brace arm 15 extend horizontally between each bracket and are connected at respective ends thereto. The brace arms are spaced vertically on the bracket and are parallel to each other. Each brace arm extends through the bowl such that the bowl is supported between the brackets by the brace arms.

Extending vertically through a mid point 17 of the brace arms is a threaded adjustment shaft 19. The shaft Is arranged to extend through each brace arm such that the shaft is free to rotated therein, and is supported at a top end 21 by an upper support nut 23. The upper support nut is fastened on to the shaft and abuts against the upper brace arm.

At a bottom end 24 of the shaft a plate 25 is fastened thereto. The shaft Is arranged to extend through the plate. On a bottom side 27 of the plate a lower support nut 29 and washer 31 is arranged to support the plate onto the shaft beneath the bowl. The plate is arranged to enclose about an open bottom end 33 of the bowl. The plate has a circumference larger than the circumference of the open bottom end of the bowl and has a upwardly extending lip 35 to contain any feed that enters the plate. A middle support nut 37 and washer 39 is located on the shaft on a top side 41 of the plate at an opposite side relative to the lower support nut. The lower and middle support nut are arranged to enable a user to adjust a gap 43 between the bottom end of the bowl and the top side of the plate such that feed can be released from the bowl onto the plate for feeding. The top side of the plate is flat. The shaft is rotatable within the brace arms which therefore allows the plate to be rotated with the shaft. The rotating element is arranged to provide an interest to animals feeding which will keep the animals at the feeding mechanism which is desired by the farmer. Rotation of the plate causes continued release of the feed onto the plate which therefore will entice the animal to feed therefrom. The adjustability of the gap is desired so as to enable the farmer to monitor or control the amount of feed released by the feeding mechanism.

While one embodiment of the present invention has been described in the foregoing, it is to be understood that other embodiments are possible within the scope of the invention. The invention is to be considered limited solely by the scope of the appended claims.

What is claimed is:

1. A feeding apparatus comprising:
   - a fame being arranged to be supported to a suitable support structure;
   - a stationary bowl member having an open bottom end being arranged to hold feed;
   - a rotatable plate at the open bottom end of the bowl member;
   - the plate having a bottom surface and an upwardly extending outer peripheral lip shaped to retain the feed on the plate;

a shaft attached to the plate and extending upwardly therefrom so as to define an axis of the shaft which the plate can rotate;

an adjustment mechanism being arranged for adjusting the spacing of the plate from the bottom end of the bowl member;

and at least one brace arm which extends from the frame at respective sides of the bowl through the bowl and which provides support for the shaft;

wherein rotation of the plate releases the feed onto the plate for feeding.

2. The apparatus according to claim 1 wherein the plate has a flat bottom surface.

3. The apparatus according to claim 1 wherein there are two brace arms which extend horizontally through the bowl and are connected to the frame on respective sides of the bowl.

4. The apparatus according to claim 1 wherein the bowl is arranged to be connected at a top end to a feed container.

5. The apparatus according to claim 1 wherein the top of the bowl is wider than the bottom to define generally a cone shape.

6. A feeding apparatus comprising:

a frame being to be supported to a suitable support structure;

a stationary boot member mounted on the frame and having an open bottom end being arranged to hold feed;

a rotatable horizontal plate at the open bottom end of the bowl member;

the plate having a bottom surface and an upwardly extending outer peripheral lip shaped to retain the feed on the plate;

an adjustment mechanism arranged for adjusting a spacing of the plate from the bottom end of the bowl member;

a shaft attached to the plate and extending at right angles thereto and defining an axis of the shaft around which the plate is free to route;

the shaft being supported relative to the bowl at an upper support location in the bowl;

and the shaft being located relative to the bowl at a lower support location in the bowl such that the upper and lower support locations restrict the shaft against side to side movement within the bowl to hold the plate substantially horizontal;

wherein rotation of the plate releases the feed onto the plate for feeding.

7. The apparatus according to claim 5 wherein the plate has a flat bottom surface.

8. The apparatus according to claim 5 wherein the upper and lower support locations are defined by two brace arms which extend horizontally through the bowl and are connected to the frame on respective sides of the bowl.

9. The apparatus according to claim 5 wherein the bowl is arranged to be connected at a top end to a feed container.

10. The apparatus according to claim 5 wherein the top of the bowl is wider than the bottom to define a generally cone shape.

* * * * *